United States Patent Office 3,383,441
Patented May 14, 1968

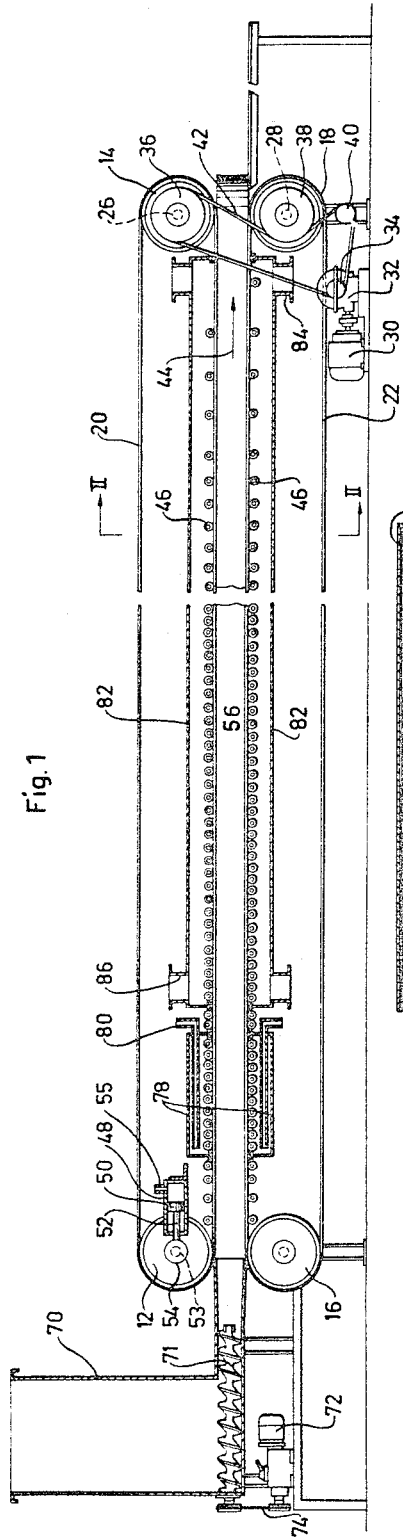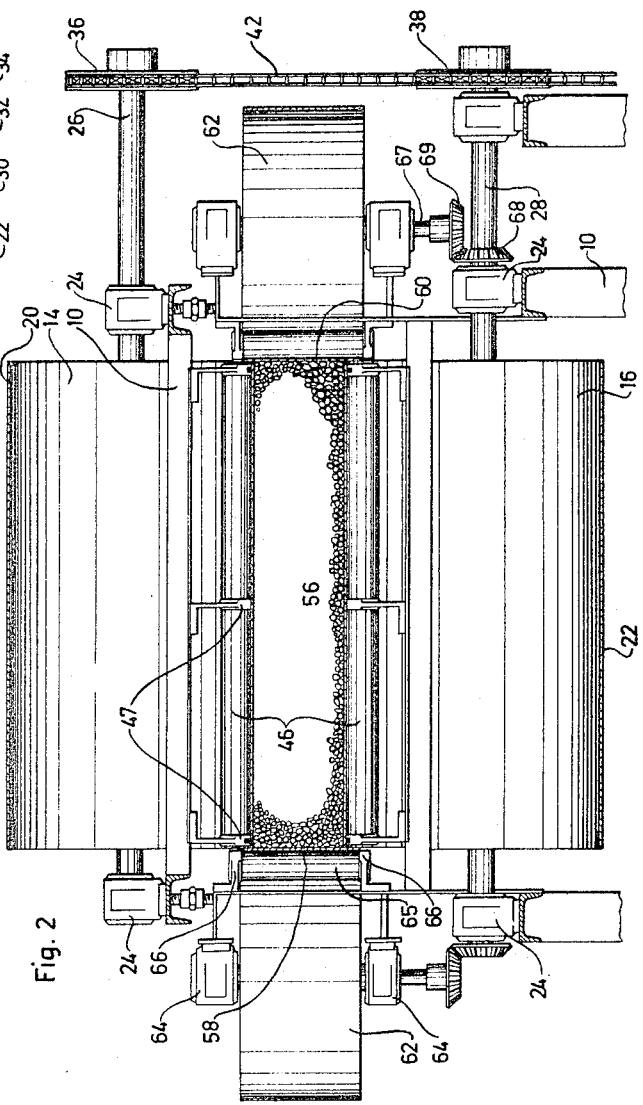

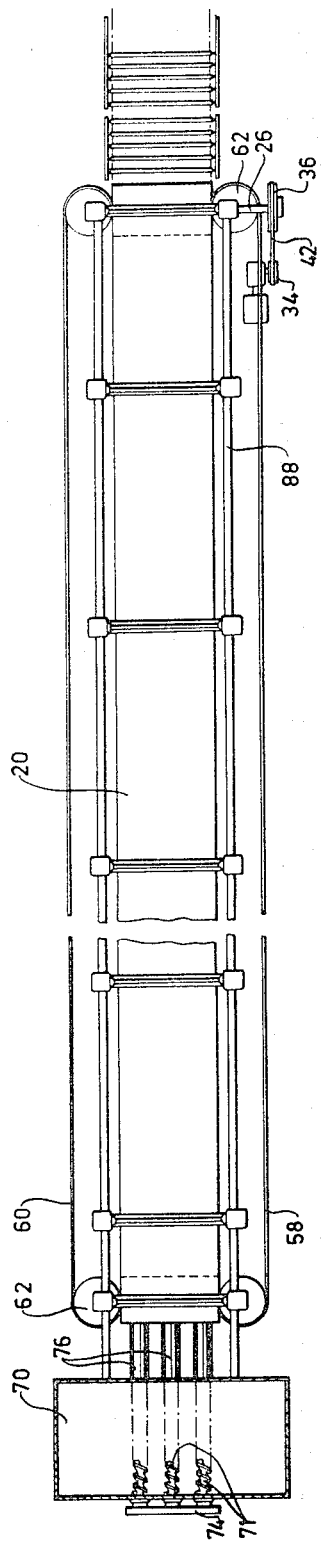

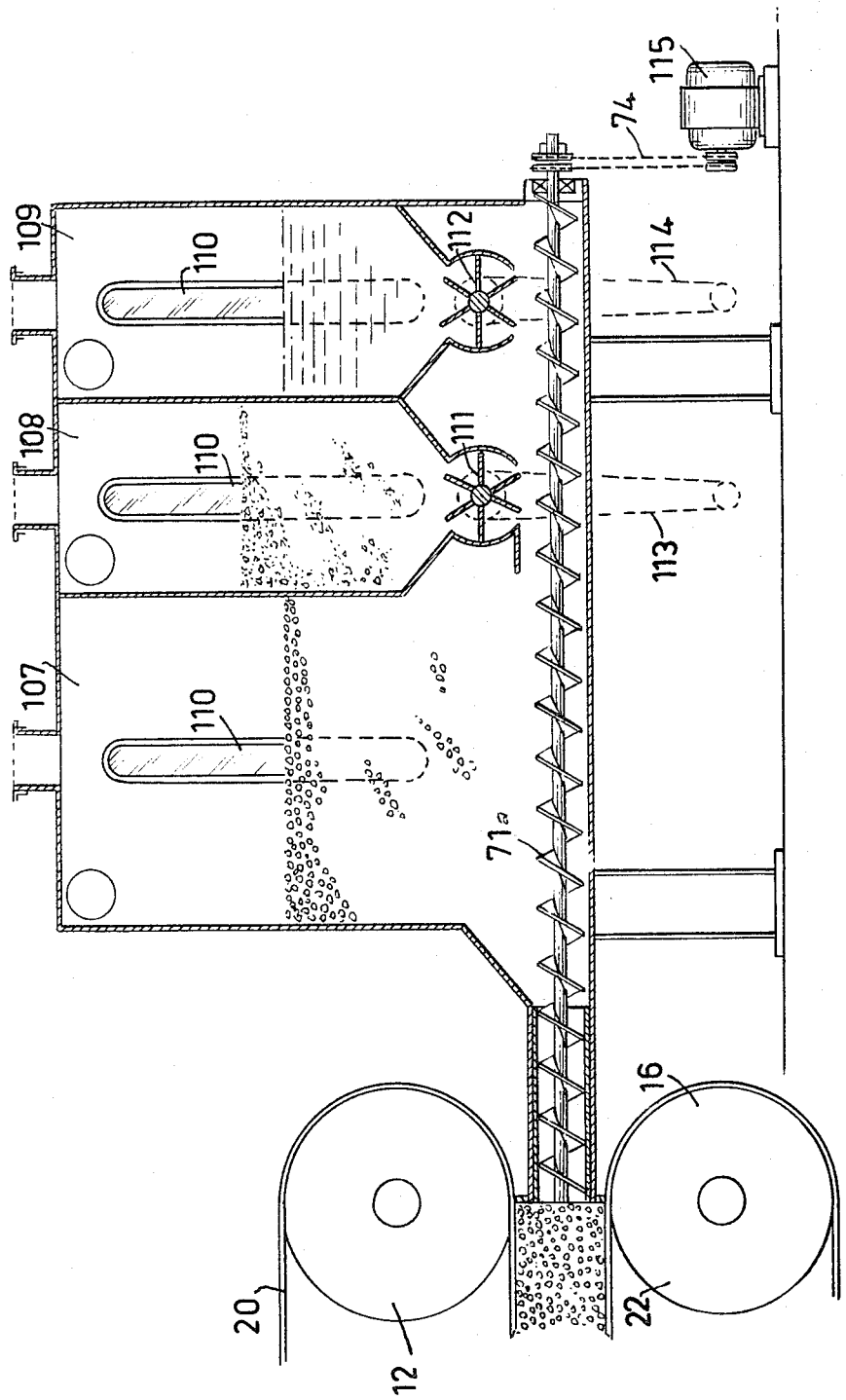

3,383,441
METHOD AND APPARATUS FOR PRODUCING BODIES OF SYNTHETIC THERMOPLASTIC MATERIAL
Lars Sten Robert Norrhede and Erik Torsten Linde, Alvangen, Sweden, assignors to Isoleringsaktiebolaget WMB, Goteborg, Sweden, a joint-stock company of Sweden
Continuation of application Ser. No. 258,105, Feb. 7, 1963. This application July 27, 1966, Ser. No. 568,296
5 Claims. (Cl. 264—51)

ABSTRACT OF THE DISCLOSURE

A method and apparatus by which a mass of individual heat expandable granules of a synthetic thermoplastic material is converted into a foamed coherent agglutinated body which comprises feeding the granules continuously into the input end of an open-ended channel having a heating zone along a portion thereof in which the granules are progressively expanded against the constraining surfaces of the channel by contact with steam while the thus foamed body is being moved therethrough and cooled progressively while moving through a cooling zone along a portion of the channel between the heating zone and the discharge end of the channel.

---

This application is a continuation of our pending application, Ser. No. 258,105, filed Feb. 7, 1963, the latter application itself being a continuation-in-part of our previous application, Ser. No. 576,052, filed Apr. 4, 1956, and subsequently abandoned in view of the filing of application, Ser. No. 258,105.

This invention relates to an apparatus and method for the continuous production of slabs or sheets of any desired length, composed of synthetic thermoplastic granules containing a heat expandable agent, or other polymeric material which is expandable by the application of heat, to form a foamed, coherent porous structure.

The invention is particularly applicable to the production of insulating material, although not necessarily restricted thereto.

Among the objects of the invention is to provide an apparatus and method by which a slab or sheet of foamed polystyrene or other polymeric material can be produced by continuously charging beads or similar particles of the expandable polymeric material, for instance, such as that manufactured under the trademark "Dylite" by Koppers Company, Inc., of Pittsburgh, Pa., into a moving molding space, while exposing the material to a fluid or gaseous, heating medium, such as steam or air, and continuously discharging it from the end of the moving molding space.

Another object is to provide an apparatus and method for producing foamed slabs or other structures of uniform quality and porosity and of any desired length and predetermined thickness and width, while maintaining constant conditions of processing.

A further object is to provide an apparatus and method by means of which the charging of the polymeric material, and its progress through the moving molding space can be regulated and the temperature and pressure of the heating medium can be controlled, so as to create just sufficient pressure on the expandable polymer to prevent reverse movement of the material in the molding space while at the same time causing it to expand and become agglutinized into a coherent porous structure of uniform quality and density throughout, which in cross-sectional area, substantially conforms to the cross-sectional shape of the moving molding space.

Still a further object is to provide an apparatus and method of the aforementioned character, which requires less total space and manpower per unit of volume of the foamed structure produced than heretofore required in producing foamed structures by the individual batch molding process, which requires repeated emptying and refilling of the individual molds, with consequent loss of time and economy.

A still further object is to provide an apparatus and method of the aforementioned character, which lends itself to the production of foamed, coherent polymeric structures from granules of different densities and/or different particle size, and makes it possible to recover scrap and cuttings from the foamed structure by mixing it with fresh material and expand them together into a foamed slab or sheet, with consequent saving in production cost, and in the cost of the final product.

Another object is to provide an apparatus and method of the aforementioned character, which lends itself to the continuous production of a sandwich type structure having an inner core of foamed polymeric material, with facing material of aluminum, paper and similar material on each side of the core, whereby to produce a complete panel for construction purposes.

In terms of broad inclusion, the invention contemplates the production of slabs or sheets of expanded or foamed polymeric material by continuously charging, at a regulated rate of speed, granules or beads of the polymeric material, which may be of previously partially expanded form, such as "Dylite," into a closed moving mold comprising a plurality of constraining surfaces, such as parallel, spaced endless belts, while continually injecting and diffusing through the material a fluid or gaseous heating medium, such as steam or air, at a controlled temperature and pressure, whereby the polymeric material is expanded against the sides of the molding space while being continuously transported by the belts at a controlled rate of progress through the molding space, and ejecting the thus formed coherent formed continuous slab or sheet from the molding space and cooling it so as to prevent further expansion, and then cutting the slabs to the desired length.

The starting polymeric material may consist of granules of expandable polystyrene beads, which may be partially expanded into a porous condition before being charged into the moving molding space, and may thereafter be further expanded and agglutinated while being moved through the molding space by the diffusion of the gaseous or fluid heating medium through the porous mass, under controlled temperature and pressure.

The initial expansion step may be performed in accordance with Patent 2,944,292, dated July 12, 1960, on an application filed Apr. 4, 1956, under Ser. No. 576,051, by Lars Sten Robert Norrhede, one of the joint inventors named in this application. Another method of pre-expansion is described in Patent No. 3,023,175 of the Koppers Company.

The polymeric material, such as polystyrene, should, of course, contain a heat expanding agent, such as petroleum ether. However, polymeric particles capable of being expanded by application of heat are well known, and need no particular specification.

A suitable polymeric material, which has been found particularly useful, is the expandable polystyrene product sold by Koppers Company, Inc., under the trademark "Dylite."

The above and further features and objects of the invention will be more apparent from the following description taken in conjunction with the accompanying drawing, which discloses by way of example an embodiment of the invention.

In the drawing:

FIG. 1 is a vertical longitudinal section through the apparatus according to the invention.

FIG. 2 is a section taken along the line II—II of FIG. 1, drawn to a larger scale.

FIG. 3 is a top plan view of the apparatus.

FIG. 5 is a vertical sectional view of a modification showing how the apparatus can be used for mixing scraps and cuttings with fresh raw material.

Figure 4:
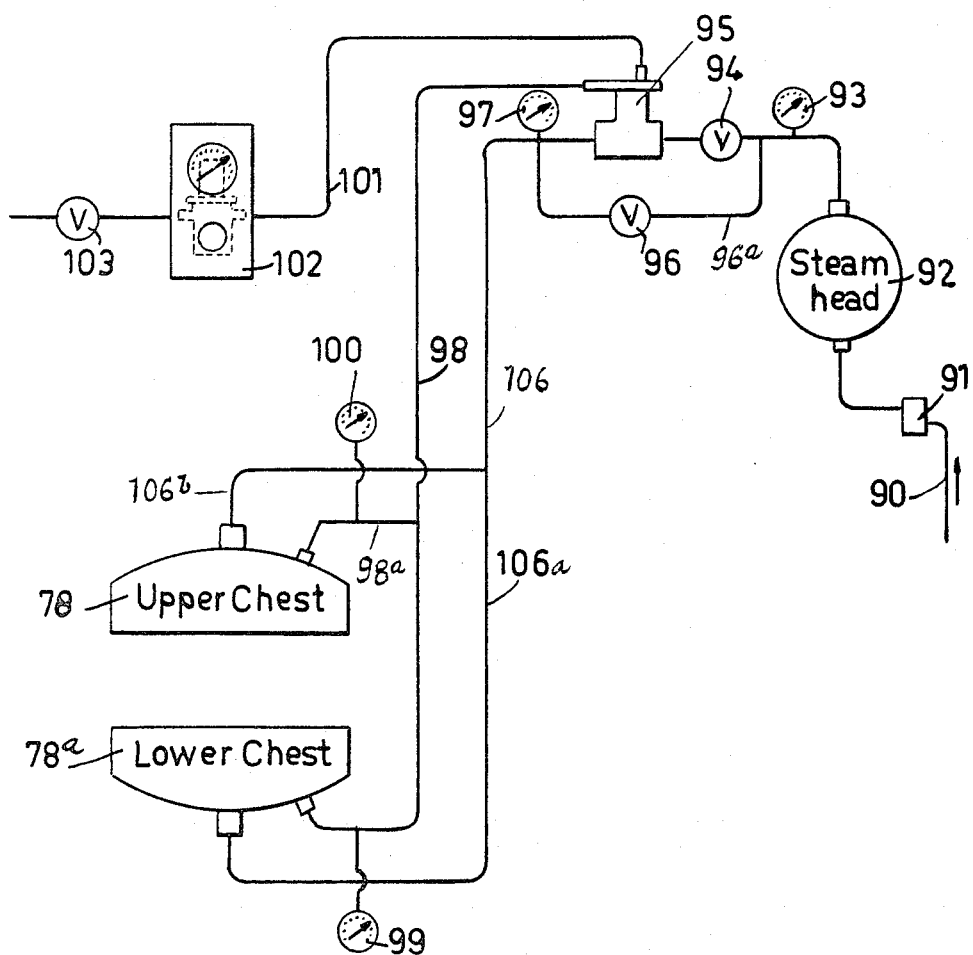
FIG. 4 is a diagrammatic view of the control system.

Referring to the drawings, the reference numeral 10 in FIG. 2 denotes a frame carried by a base support not shown. Mounted in said frame are two upper turning drums 12 and 14, respectively, and two lower drums 16 and 18, respectively, about which the perforated endless steel belts 20 and 22, respectively, extend. These endless belts are preferably of stainless steel.

FIG. 2 shows bearings 24 for the two drums 14 and 18 with their shafts 26 and 28, respectively. The belts have a substantially larger width than the vertical space between their opposed portions. The belts are driven by means of an electric variable speed motor 30 and gearing 32 having a driving disc 34. The driving disc 34, sprockets 36 and 38, which are secured to the shifts 26 and 28, respectively, and a sprocket 40, rotate the endless chain 42. The portion of the belts opposed to one another travel in the same direction, indicated by the arrow 44, and with the same speed. Said portions with their faces spaced from one another pass over supporting rollers 46 mounted in bearing bushings 47. During operation of the apparatus, the belts are subjected to variations in temperature and variations in the length of the belts. Such variations in length are compensated by means of pneumatically operated stretching devices which are located adjacent the non-driven turning drums 12 and 16, and one of which is shown in FIG. 1. According to said figure, a cylinder 48 may house a piston 50, the rod 52 of which is in connection with a disc 54 mounted on the shaft 53 of the drum 12. The bearings 24 are displaceable relatively to the support, and a pressure medium acting on the piston 50 through a conduit 55 from a larger pressure chamber or the like, ensures that the belts 20, 22 always are kept stretched.

The intermediate space or channel 56 formed between the belts 20 and 22 may be closed along the longitudinal sides by endless belts 58 and 60, respectively (see FIGS. 2 and 3). Said belts are placed in the same manner as the belts described hereinbefore, on turning drums 62 mounted in bearings 64. Adjacent the external faces of that portion of each of the belts 58, 60, which form the side walls of the channel 56, there are further disposed support rollers 65 resting in bearing bushings 66. In the embodiment shown, the belts 58 and 60 are driven by the same motor that drives the belts 20 and 22. For this purpose, meshing conical gears 68 and 69 are disposed on the shaft 28 and the shafts 67 of the adjacent turning drums 62.

It should be understood, however, that it is conceivable that the belts 58 and 60 may be replaced by stationary wall members.

The pre-expanded granular mass is fed into the apparatus through a conical hopper 70, in the base portion of which a plurality of screw conveyors 71 are arranged, preferably side by side. The conveyors are driven synchronically through a transmission device 74 and an electric variable speed motor 72. The conveyors 71 feed the mass through tubes 76 to the supply end of the channel 56. As shown in FIG. 1, adjacent to the supply end, there are provided on the external faces of the interior portions of the belts 20 and 22, boxes 78 or the like, into which steam supply tubes 80 open. The boxes are slightly recessed relatively to the plane portions of the belts, and are laterally sealed against them so as to cause the steam to be diffused through the perforations in the belts into the channel 56 from both sides. Beyond said heating zone, is a cooling zone which also may comprise boxes 82 which open into the molding space or channel 56 and are sealed against the outer faces of the belts. A cooling agent, such as air, is introduced into one of the boxes 82 through a socket 84 and escapes from the opposite end through a socket 86.

The apparatus is operated in the following manner.

The conveyors 71 introduce the mass of pre-expanded granules in such quantity as to cause them to fill the whole transverse cross-section of the channel. The mass is conveyed by the belts in the direction indicated by the arrow 44, and in this movement initially comes into contact with the steam in the heating zone. The steam passes through the perforation in the belts 20 and 22 and penetrates into the mass through the interstices between the granules. The granules are thereby heated, softened and caused to expand further. This increase of volume results from the expansion of gas enclosed in the many closed cells of the granules, due to the heating and possibly also due to remaining expanding agent. The temperature of the steam can be a few degrees over 100° C. The steam then has a superatmospheric pressure of some tenths of an atmosphere.

The belts prevent the granular mass from expanding for which reason the granules instead are molded in sequence behind one another, while air pores existing between them are sealed, and at the same time the granules are agglutinated. The expansion involves a very essential effect by creating a pressure against the belts preventing the mass from pressing back towards the feeding opening of the channel. A kind of plug of granules has thus proved to be formed within the channel 56 just in front of the steam box by the steam rushing in between the granules. Due to this plug the conveyors need not exercise any counter pressure on the granular mass which would result in the granules being pressed together mechanically and thereby to lose the desired high porosity.

The granules, thus expanded and agglutinated into a coherent body, then enter the cooling zone, which in the embodiment shown, also is formed by the belts, and is of a length preferably many times that of the heating zone. In the cooling zone, a successive reduction of the temperature of the porous body takes place. The superpressure in the granules, resulting from the increased temperature, is absorbed in this case by the belts. The cooling is effected at a lower rate since the cooling agent, after the agglutination of the granules, does not have the same possibility of penetrating into the body as did the steam in the heating stage. A coherent, porous body having, in the present embodiment, a rectangular cross-section, continuously emerges from the apparatus at the right-hand side thereof shown in FIG. 1, and is advanced for separation into blocks or slabs.

In FIG. 3, the reference numeral 88 denotes a mechanism by means of which the upper belt 20 can be raised or lowered in order to vary the height of the channel 56.

Thus, devices for supply of steam or cooling agent may also be provided adjacent the lateral belts. The belts 58 and 60 may be shorter than the belts 20 and 22 and thus end at a shorter distance inside the cooling zone. In certain cases, the belts may be constituted by plates or discs joined to one another or endless chain conveyors or the like. It is also conceivable to separate said plates from said conveyors at the discharge side of the channel 56 in order to be returned along another path to the supply side.

An important feature of the invention over the individual molding process or so-called batch molding resides in the regulation of the rate of feeding of the polymeric granules and the control of the temperature and pressure of the heating medium. It should be understood that gases are formed in the beads or granules, which mix with the gaseous heating medium enveloping the beads or granules. Part of the gases formed in the beads are trapped and remain in the beads and tend to expand the cellular wall structure of the beads. If too much heat and pressure is produced by the gaseous heating medium, the gases formed in the beads build up an internal pressure and the cellular wall structure can no longer withstand the internal gas pressure. When this occurs, which is common in the batch process, the beads at the immediate vicinity of the walls of the mold expand too rapidly and are fused together into a relatively unitary solid surface of material through which the gaseous heating medium cannot penetrate. The beads in the inner parts of the mass are not or only insufficiently affected by the heating medium. The resultant product is generally referred to as a "pop-corn" product.

It is easily possible to regulate the production of the uniformly porous product formed by the endless belts merely by operating the rate of movement thereof and supply of steam to produce a uniformly cohered product at the outlet, since by the continuous even heating the expanded granules become uniformly coherent. Obviously the feed of granules is maintained only sufficient to fill the inlet end of the channel without compression. The movement of the product through the channel accommodates the expansion whereby the product is evenly porous and of lower density than the beads supplied as set forth numerically below.

It is easily possible in the apparatus described below to adjust the clearance between belts to vary the thickness of the slab or panel while still maintaining a uniformly porous quality of the product.

The method of control utilized in the present invention is illustrated in FIG. 4 of the drawing.

Referring to said drawing, the steam is supplied to the upper and lower steam chests 78 and 78a, respectively, from a source of steam by the conduit 90 to a steam trap 91, from which it passes to the steam head 92, where the steam is built up to the desired pressure. Preferably, the pressure is in the order of 125 p.s.i.g. for reserve purposes for reasons hereinafter indicated, and the pressure is shown on the gauge 93. The steam is then admitted into the automatic regulator valve 95, known as a Leslie automatic valve, through the normally open valve 94. The Leslie valve is controlled by the air pressure in the conduit 101, which in turn is regulated by the panel loader 102. Air at about 60 p.s.i.g. is admitted to the panel loader 102 through the valve 103. For the proper operation of the Leslie valve, the air pressure in the conduit 101 should preferably be about 5 pounds more than the pressure in the steam chests 78 and 78a.

The Leslie valve 95 reduces the pressure of the steam to about 8 to 10 p.s.i.g., at which it is conducted by the conduit 106, having a diameter of about 3½", to a point at which the conduit forms two branch passages 106a and 106b leading, respectively, to the steam chests 78a and 78. These branch passages are reduced to a diameter of approximately 2½".

The pressure in the steam chests is read on the pressure gauges 99 and 100, and is controlled by the Leslie valve through the conduit 98.

The by-pass 96a, with the manually regulated valve 96, is used only as an emergency system in the event the automatic Leslie valve should break down. In such case, the manually operated valve 94 is closed and steam flows through the by-pass 96a through the now opened valve 96 to the conduit 106, and the steam pressure is manually adjusted by the valve 96 and is read on the gauge 97.

It should, of course, be understood that the pressures mentioned herein are subject to variation, depending upon the nature of the starting material. These pressures, ranging from between 35 and 40 p.s.i.g., have been used under certain circumstances, and emphasize the advantage of a system which can be effectively controlled with respect to pressure and temperature, in contrast to the individual or batch process heretofore used.

Thus, in order to properly expand the polymeric material within the moving molding space 56 defined by the endless belts 20, 22 and 58 and 60, the steam injected into the channel through the steam chests 78 and 78a must heat the expandable polymeric material at least to a temperature range within which the softening of the polymer occurs and within which the blowing agent causes expansion of the polymer by the gas developed within the beads as hereinbefore explained. The steam, however, must not heat the expandable material to a temperature which melts the polymer and produces a so-called "popcorn" product.

It has been found from experimentation that the steam should produce a temperature of from about 100° to 125° C., to cause expansion and softening of the polymeric particles.

Again it is emphasized that these ranges are only approximate and depend upon the nature of the starting material and vary with the density of the polymeric material.

For example, when expandable polystyrene having a density of two pounds per cubic foot is heated in accordance with this invention, a temperature of about 110° C. is sufficient to soften the polymer and create sufficient expansion against the walls of the moving molding space without affecting the uniform porosity of the product, and to prevent reverse movement of the granules in the channel.

Furthermore, variation in the rate of progress of the material through the moving molding space in relation to the degree of temperature and pressure in order to attain the desired degree of expansion is an essential feature of the invention.

The necessity of such variations becomes more evident if raw materials of different density, different amount of expanding agent and/or different particle size are used. In other words, control of these variables, depending upon the raw material used and the product desired, is an essential feature inherent in the invention, which is totally lacking in the batch process.

From the foregoing, it should readily be understood that there is a definite relationship between the rate of progress of the material transported through the moving molding space and the heat and temperature of the gaseous heating medium, since the heat absorbed by the polymeric material per unit of volume of material ultimately determines the temperature of the expandable material. Thus, the speed of the beads must be subject to variations in order to control the exposure time in relation to heat and pressure, in order to produce a uniformly porous coherent structure regardless of the density of the raw material.

After the polymeric beads are expanded as herein described, the resultant foamed slab or sheet must be cooled down in the cooling zone 82 in order to prevent further expansion and distortion as it emerges from the moving molding space.

FIG. 5 shows an embodiment wherein polymeric particles of different densities are thoroughly mixed before being charged into the moving molding space, which is of identical construction as that shown in FIGS. 1 to 3, and comprises the endless belts 16 and 20 and rotatable drums 12 and 22. The modification illustrated is intended particularly for the recovery of scraps of previously foamed slabs or sheets. These scraps are first broken up into small pieces in a conventional hammermill, however, without causing the expanded beads to become crushed or comminuted. The scaps are practically free from expanding agent and are therefore, from expansion point of view, classified as a "dead" material.

The pre-expanded polystyrene beads are charged into the hopper 107, whereas the broken up pieces of scrap are charged into the hopper 108.

A third hopper 109 containing a liquid adhesive may be used under certain circumstances where the nature of the material to be mixed has substantially different densities or where the pieces of scrap are substantially larger and mixed with other materials. In such cases, a binder might be desirable to bond together the expanded mixed particles.

As binder, there may be used ordinary polystyrene dissolved in a proper solvent. This is discharged by means of the paddle wheel 112 onto the conveyor screws 71. However, for the purpose of further discussion of this modification, the hopper 109 and its contents will be disregarded.

The scrap material in hopper 108 is discharged onto the screw conveyors 71 by means of the paddle wheel 111, and the fresh starting material, which in this case consists of pre-expanded polystyrene beads, drops freely onto the conveyor screws 71. The amount of scrap may be up to 30% of the pre-expanded beads and is frequently 10 to 15% thereof.

The screw conveyors 71 are rotated by means of a variable speed motor 115 and drive chain 74.

The paddle wheels 111 and 112 are rotated by suitable conventional drives 113 and 114.

The polystyrene beads and the beads from the scrap are thoroughly mixed by the rotation of the conveyor screws 71 so as to constitute a fairly uniform mixture substantially similar to a fresh charge of pre-expanded polystyrene beads.

Obviously the batch process heretofore employed does not lend itself to the recovery of scrap material, and thus the present invention results in substantial economy in comparison with the conventional method.

The following examples will also illustrate the great economical advantage by saving of heat resulting from the invention as compared with the batch method.

STEAM NEEDED FOR CONTINUOUS MOLDING COMPARED TO BATCH MOLDING

Foamed polystyrene 1 lb./cu. ft. or 16 kg./m.$^3$

1. HEAT NEEDED PER M.$^3$ FOR THE EXPANSION (TEMPERATURE INCREASE FROM 20° TO 110° C.)

|  | Kcal. |
|---|---|
| To heat—Polystyrene beads (16 kg.) | 475 |
| Water in the beads | 14 |
| Foaming agent in the beads | 16 |
| Vaporize—Water | 86 |
| Foaming agent | 27 |
| Total | 618 |

2. HEAT NECESSARY TO HEAT THE MACHINE (a) Itself per m.$^3$ foam (at 13¼″ thickness): 75 kg. steel 1 mm. band thickness including heat leakage through the machine _____ 750
(b) Heat necessary to heat the batch mold: 40 kg. aluminum estimated per mold including heat leakage through batch molding machine _____ 7900

SUMMARY

|  | Heat needed per m.$^3$ | |
|---|---|---|
|  | Continuous machine, Kcal. m$^3$ | Batch molding, Kcal. m.$^3$ |
| 1. Heat necessary for the beads | 618 | 618 |
| 2. Inefficient heat (through heating bands, molds, etc.) | 750 | 7,900 |
|  | *1,370 | *8,520 |
| Efficient heat in percent | 54.8 | 7.3 |

*To this has to be added loss through steam leakage.

It will be noted from the above tables that only about ⅙ of the amount of heat required for batch molding is needed for the continuous process. Furthermore, the heat in the form of steam is added uniformly during the period of time required for molding a predetermined length of the shaped body. This saving in heat results partly from the fact that in the continuous process, only the thin steel bands which are about 1 mm. thick, have to be heated and cooled, in comparison with the heavy stationary molds in the batch process.

The following distictions are also made between the instant invention and the batch or individual molding process:

(1) The cooling period in the continuous process using thin moving steel bands to shape the articles is considerably shorter than in the batch process. In the continuous process, the cooling time varies between 3 and 4 minutes; whereas in the batch process, it may range between 15 and 45 minutes, depending upon the quality of the beads or granules.

(2) In the continuous process, there is a tendency in the granules during their expansion within the confining moving surfaces to create a pressure against these surfaces sufficient to prevent reverse movement of the granules in the channel, but not sufficient to reduce the porosity of the coherent body. By regulating the speed of the feed screws used in the continuous process, as herein explained, the degree of fusion and porosity of the coherent body may be varied. After the pre-expansion, the granules occupy about 52.5% of a receptacle which they just completely fill. In other words, the air spaces between the granules represent together about 47.5% of the total volume. In order to get these air spaces completely filled up by the material, the granules obviously have to expand 47.5% or somewhat more, as their walls cohere in a second expansion. This second expansion takes place in the closed molds used in the batch process or between the belts used according to this invention. At an expansion of this character, the density or specific weight of the body is unchanged. The overall volume of the granular body is thus the same before and after the second expansion, notwithstanding the fact that the individual granules have expanded to somewhat less than double volume.

In the batch process, the mold must be completely filled by the pre-expanded granules, to avoid the so-called "popcorn" product.

According to the present invention, the volume which the individual granules occupy can increase during the second expansion. This means that the granules are not only expanded to fill up the air spaces between the same, but are also expanded to a greater overall volume by cohesion. The granules are then to be pre-expanded only to such degree that in the second expansion, they can expand more than 47.5%. The pre-expanded granules are fed into the channel 56 between the belts by means of the conveyors 71 at a controlled volume rate per unit of time, said rate being less than the volume rate per unit of time of the channel defined by the belts. The belts thus produce a volume for the granules per unit of time which is greater than the volume per unit of time of the pre-expanded granules passing through the conveyors. In that way, the granules not only expand and agglutinate and fill up in the air spaces between the same, but also further expand to obtain a greater body, and consequently less density, when passing through the channel of the machine.

The specific weight of the pre-expanded granules is usually between 1.05 and 1.1 lb./cu. ft., while the finished body may have a specific weight which is reduced to 0.9 to 1 lb./cu. ft. It should be pointed out that this result can only be obtained with a synthetic thermoplastic raw material and not with cork or the like.

(3) The feed screws used in the continuous process cause the granules to be thoroughly mixed before their entry into the channel, resulting in the formation of a homogeneous coherent body, which has an almost uniform weight per unit of volume throughout its cross section. It is not possible to obtain such a result from the batch process as exemplified, for instance, by Stastny Patents Nos. 2,744,291; 2,787,809; 2,950,261 and 2,681,321, where one is entirely dependent upon the manner of filling each mold and of introducing the steam into it. Furthermore, there is a certain "edge" or "pop-corn" problem in the shaped body produced by the batch process. This is totally absent in the body produced by the continuous process.

(4) In addition, the continuous process lends itself to the production of a coherent body which is covered by an outer "skin."

The level of the material in the hoppers 107, 108 and 109 may be observed through the windows 119.

It should be understood that the foregoing description is given by way of example and not by way of limitation and lends itself to a variety of expressions within the scope of the appended claims.

What we claim is:

1. The method of converting granules of synthetic polystyrene containing a heat expanding agent into a cohered foamed agglutinated body by expanding the granules by treatment with steam, which comprises:

(a) continuously feeding said granules into the input end of an open-ended elongated molding channel defined by constraining surfaces having openings therein for the admission and discharge of steam into and out of said channel, and by confining side walls, said channel including a heating zone located downstream of said input end;

(b) moving said granules continuously through said molding channel in contact with said constraining surfaces in a direction away from the feed-in end towards a discharge end;

(c) said granules being fed into said channel in a quantity to maintain said channel continuously filled and moved progressively at a rate of speed to accommodate the expansion thereof into a foamed body of uniform porosity;

(d) continuously introducing steam under pressure into the heating zone to soften and expand the said moving body of granules against said constraining surfaces without any substantial compression thereof;

(e) said steam being intorduced at a temperature normally exceeding 100° C. at atmospheric pressure for a period of time and in a quantity sufficient to vaporize the heat-expanding agent to expand the granules in said heating zone and to cause them to become agglutinated progressively into a foamed coherent body while moving through said heating zone;

(f) said steam being intorduced through the said openings in said constraining surfaces upward of the lower and downward of the upper as the granules pass through said heating zone into said porous body of granules, passing thence upstream into said porous body of granules, being discharged through said constraining surface openings before moving into said heating zone, whereby the steam passes evenly through said moving body of granules to evenly heat, expand, agglutinate and seal the interstices of said porous body as it passes through said heating zone;

(g) progressively cooling said evenly agglutinated porous body to reduce the temperature below the softening point of the foamed molded body; and (h) continuously discharging the coherent foamed body from the discharge end of the channel.

2. The method defined in claim 1, wherein said granules of thermoplastic material are fed into said molding zone in admixture with comminuted scrap recovered from said coherent foamed plastic mass.

3. The method defined in claim 1, wherein said thermoplastic material is beads of polystyrene.

4. An apparatus for continuously converting granules of a synthetic thermoplastic material containing a heat-expanding agent into a coherent foamed agglutinated body, said apparatus comprising:

(a) an open-ended elongated molding channel defined by upper and lower belts having openings for admission and discharge of steam and cooling fluid into and out of said channel, and confining side walls;

(b) variable drive means for moving said belts;

(c) a hopper disposed externally of said channel and connected thereto for discharging and receiving a supply of granules to maintain said channel filled therewith;

(d) said feeding means and said variable drive means being operable to feed said granules in quantities which will fill and maintain the feed-in end of the channel filled at the rate of movement of said belts at a speed to accommodate said feed and expansion of the granules into a body of foamed controlled porosity;

(e) steam boxes arranged at the outer faces of the upper and lower belts, said boxes being located downstream of the feed-in end of the belts, and being slightly recessed relative to the plane portions of the upper and lower belts and substantially sealed laterally against the side walls, whereby steam will pass from said steam boxes upward through the lower and downward through the upper belt into the center of the moving body of granules in said molding channel, and thence laterally upstream and out through the porous granular body toward said supply end;

(f) means for supplying steam under pressure to said steam boxes; and (g) cooling boxes downstream of the heating boxes and arranged at the outer faces of the belts from which cooling fluid may be passed through the belts for circulation over the moving product and means connected to said cooling boxes for impelling cooling fluid circulation therethrough.

5. The method as defined in claim 1 wherein the cooling is applied initially only to the surface of the molded body to reduce the temperature thereof.

References Cited

UNITED STATES PATENTS

| 2,590,757 | 3/1952 | Cornelius et al. | |
| 2,744,291 | 5/1956 | Stastny et al. | |
| 2,787,809 | 4/1957 | Stastny. | |
| 3,142,864 | 8/1964 | Pelley | 264—47 X |
| 3,178,768 | 4/1965 | Edberg | 264—53 X |
| 3,214,793 | 11/1965 | Vidal | 264—51 X |

OTHER REFERENCES

Koppers booklet. "A new foam material . . . Dylite expandable polystyrene." C. 1954. pp. 17–28. Copy in 264—53.

ALEXANDER H. BRODMERKEL, *Primary Examiner.*

P. E. ANDERSON, *Assistant Examiner.*